Patented Dec. 12, 1939

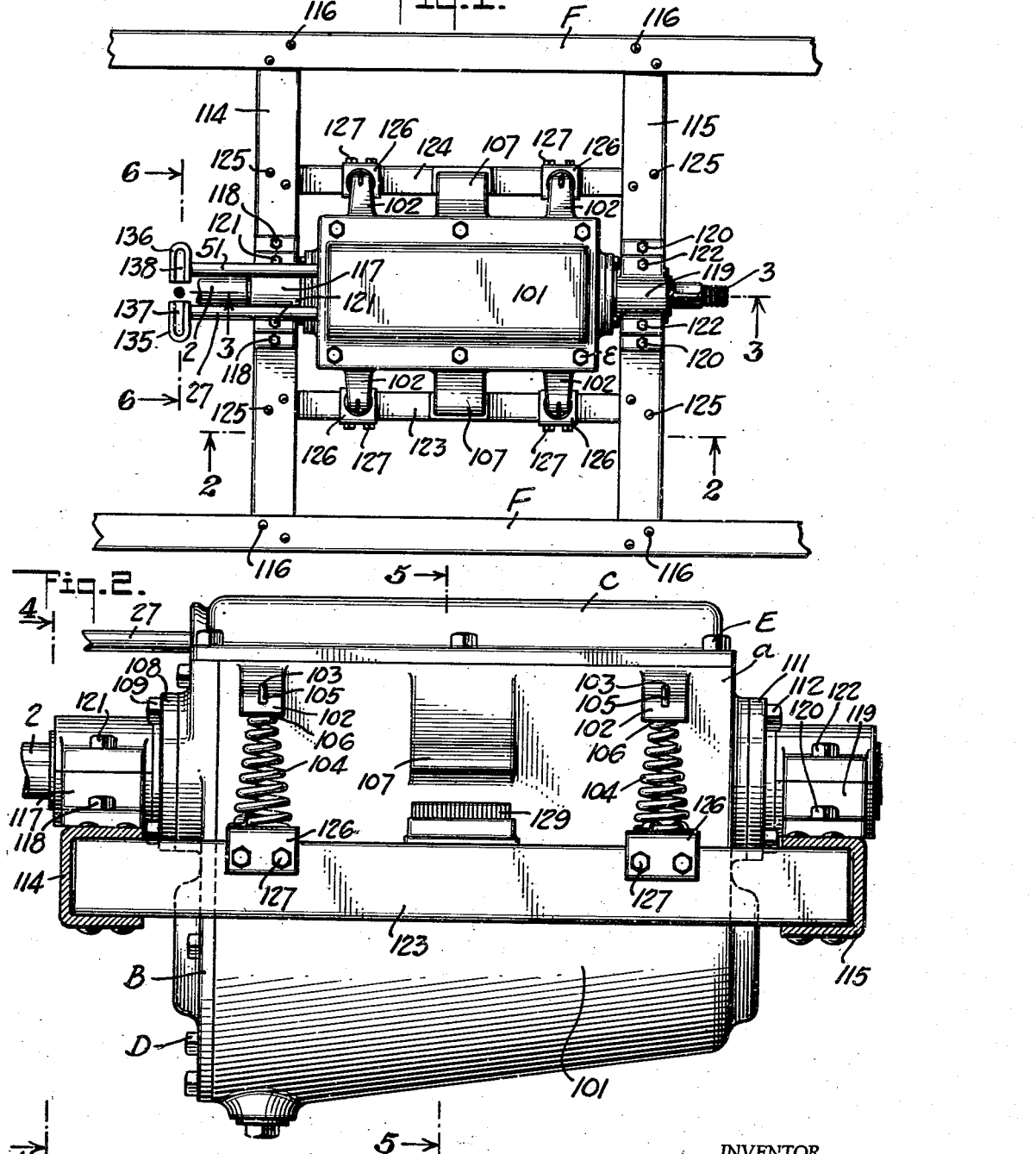

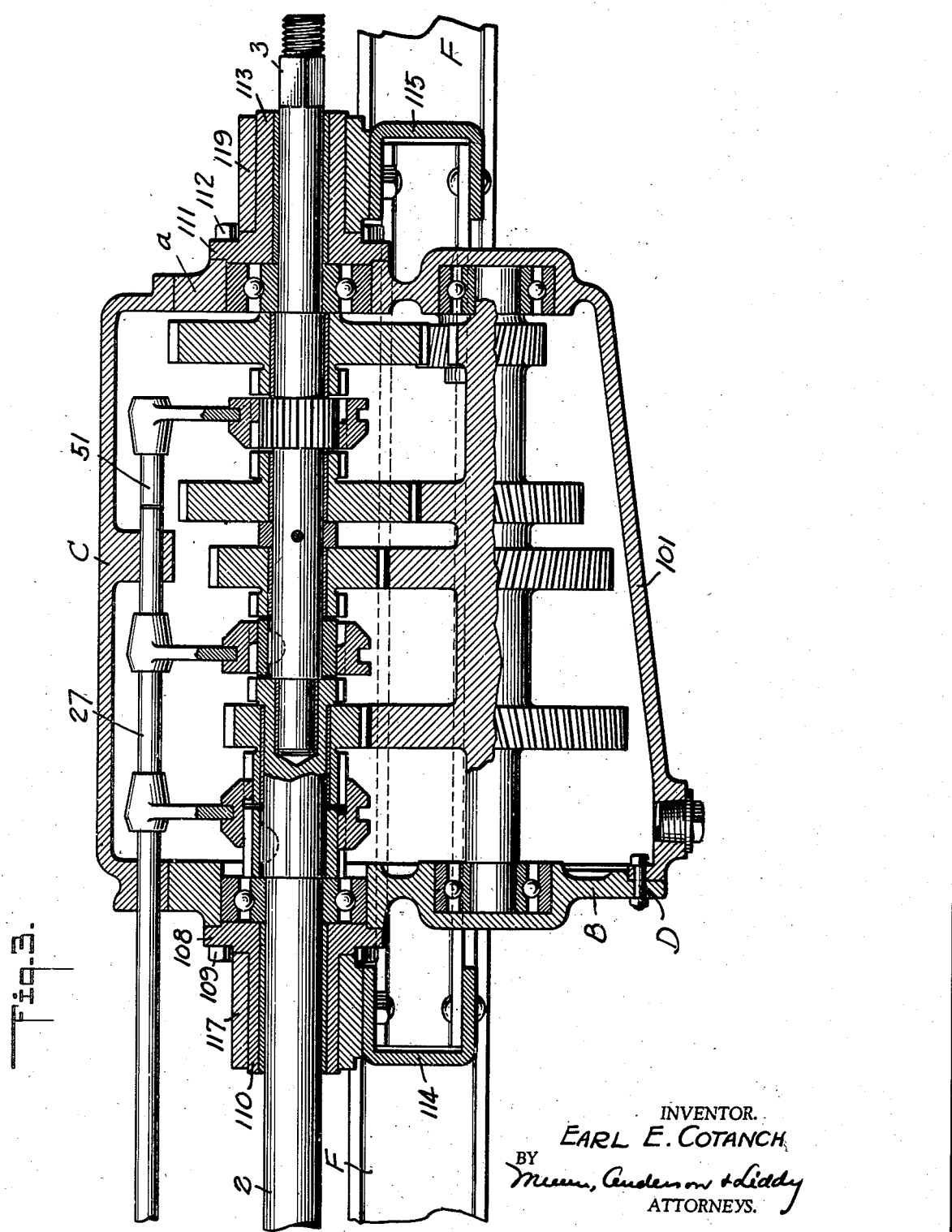

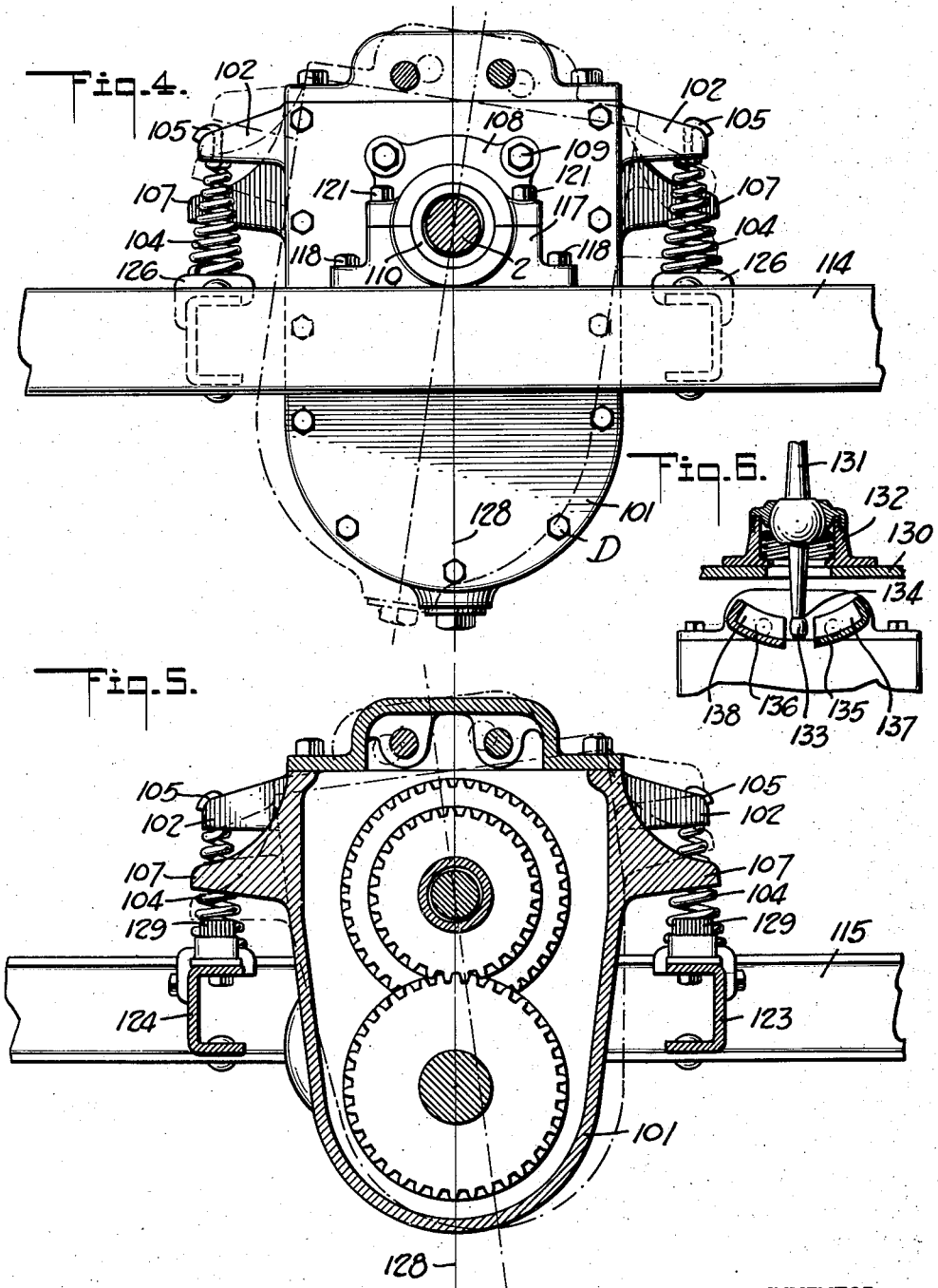

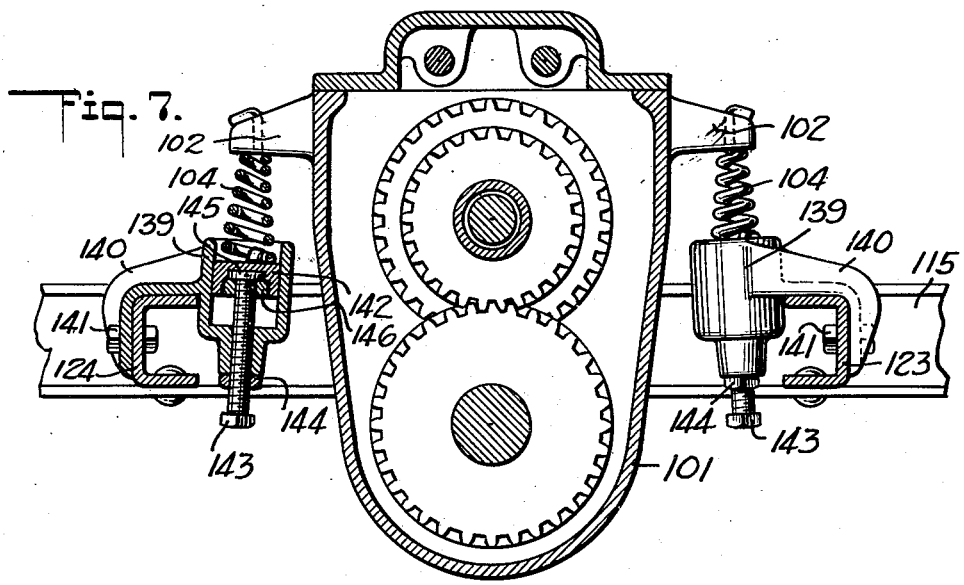
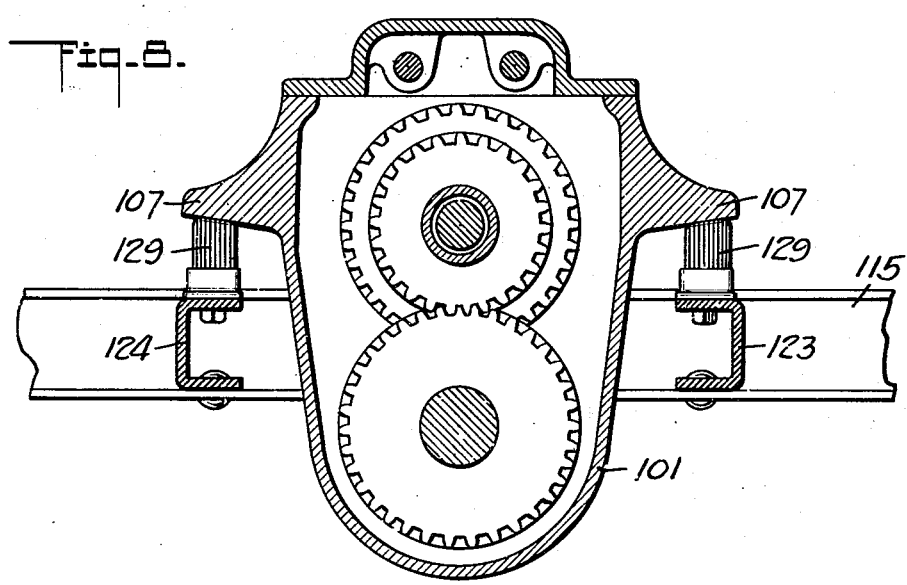

2,182,789

UNITED STATES PATENT OFFICE 2,182,789

COMPENSATING SUPPORT FOR DRIVING MECHANISMS

Earl E. Cotanch, Los Angeles, Calif.

Application November 26, 1934, Serial No. 754,919

16 Claims. (Cl. 74—411)

This invention relates to transmissions generally.

In the present state of the art, it is general practice to rigidly secure the housing of a transmission to a stationary part, such as, in the adaptation of transmissions to motor vehicles, to the clutch housing, so that the transmission housing, as is well known, will serve as a fulcrum for the respective driving mechanisms in providing a positive drive. If the transmission housing or support for the driving mechanism were not stationary, and a load were applied to the transmission, in operation, certain gears of the driving mechanism would have a tendency to give way and displace their axes in a direction opposite to the direction of rotation of the driven or load shaft and thus avoid moving the load.

While the method of rigidly securing the transmission housing, in the manner aforestated, is satisfactory in providing the desired fulcrum for the driving mechanisms, its inherent disadvantage lies in the fact that, as a rigid object, it cannot absorb thrusts or shock when imposed thereon.

It is well known that the initial thrust or shock resulting from the application of a load to a transmission of the positive drive type and starting the load has a tendency to stall the engine or source of power before the same can gain momentum over the load.

To avoid this condition, it has been considered advantageous to interpose a disk type clutch between the engine or source of power and the transmission so that the respective driving mechanism of the transmission can be connected to the load while the clutch is disengaged. The clutch is then gradually engaged so that the engine can gain momentum over the load while the load is being moved.

The initial thrust and resulting shock of moving the load is first imposed upon the teeth of the gears of the driving mechanism and in turn upon the support for the driving mechanism or transmission housing. The latter, being rigid, cannot absorb the thrust with the result that the clutch mechanism, being the only mechanism not of a rigid nature between the load and source of power, is compelled to absorb or compensate for it. This action results in relative slippage of the clutch facings, making necessary, in many instances, frequent relining thereof and, in some instances, the complete replacement of the clutch mechanism.

The primary function of a clutch, as is well known, is to provide a positive connection and disconnection between the source of power and the transmission or load, but, as previously stated, in many of its adaptations, it must also function to absorb primary thrusts imposed upon the driving mechanisms of the transmission. The latter function can only be accomplished through slippage and friction within the clutch mechanism.

Numerous attempts have been made for the elimination of a clutch, interposed between a transmission and the source of power, such as by providing transmissions wherein the driving mechanisms are of a yieldable type and therefore transmit the power from the source of power to the load in a yielding manner. The resulting loss of power in such types of transmission is deemed to make the same impractical for general use.

No satisfactory provision has been made in the art for absorbing the initial thrusts imposed upon the driving mechanisms of a transmission while moving a load.

It is a very important object of this invention to provide a housing or support for the driving mechanism of a transmission which includes means for yieldingly absorbing thrusts imposed upon the said driving mechanism.

It is another important object of the invention to provide a transmission wherein the driving mechanism is adapted for first yieldingly and then positively transmitting power so as to first absorb thrusts imposed thereon and to then transmit the full power from the source of power to the load less ordinary loss of power caused by friction of parts.

A further important object of the invention is to provide means for mounting a transmission organization for rocking movement as and when circumferential thrusts are imposed upon the said organization together with means for yieldingly resisting the rocking movement so that power can be smoothly and evenly transmitted through the said organization.

It is a still further object of the invention to provide a transmission organization together with means for supporting the organization for rocking movement about a fixed axis and means for stopping the rocking movement of the said organization so that a positive transmission of power can be transmitted through the said organization.

Another object of the invention is to provide means for placing a transmission organization, which is adapted to rock or oscillate, in respective conditions of forward drive, in a condition of reverse drive or in a condition of neutral.

It is a further important object of the invention to provide a transmission which is adapted to rock or oscillate about a fixed axis together with means for applying a counterforce to the transmission to first retard and then stop the rocking or oscillating movement of the transmission when the same is transmitting power through either a forward or reverse driving mechanism.

It is still another object of the invention to provide a transmission which is adapted for rocking movement about a fixed axis together with means for yieldingly retarding or cushioning the rocking movement of the transmission and means for adjusting the loading of the first mentioned means so that the stress, resulting from circumferential thrusts imposed upon the driving mechanisms will be gently and evenly absorbed when light or heavy loads are being moved through the transmission.

A further important object of the invention is to provide a transmission organization which is adapted to rock or oscillate about a fixed axis or center of gravity together with means for applying a counterforce of a yielding or cushioning nature to the organization, on one or both sides of the said axis or center of gravity, to counteract the rocking or oscillating movement of the said organization so that the organization tends to maintain a position of stable equilibrium or state of rest and so as to enable the same to absorb thrusts imposed upon the driving mechanisms as and when loads are applied to or moved through the organization and so that loads can be engaged to or moved through the said organization in either a forward or reverse direction without the necessity of engaging or disengaging or using a clutch mechanism between the transmission organization and the source of power.

In addition to the objects and advantages above referred to, other objects and advantages will be apparent from the following description.

Referring to the drawings,

Figure 1 is a plan view of the transmission and illustrating one form of a mounting for the transmission on a motor vehicle chassis;

Figure 2 is an enlarged vertical longitudinal view taken on the line 2—2 of Figure 1;

Figure 3 is an enlarged vertical longitudinal sectional view taken on the line 3—3 of Figure 1, with parts in elevation;

Figures 4 and 5 are transverse sectional views taken, respectively, on the lines 4—4 and 5—5 of Figure 2 and looking in the direction of the respective arrows;

Figure 6 is a transverse sectional view taken on the line 6—6 of Figure 1, and illustrating the manner in which the transmission is associated with the change speed lever;

Figures 7 and 8 are sectional views similar to Figure 5 and illustrating, respectively, different forms of mountings for the transmission.

Referring now to the embodiment of the invention as illustrated in the drawings, the transmission comprises a housing 101 which for convenient assembly of the organization, is comprised of a section A, a front plate B and a cover plate C. Section A and plate B are secured together by bolts D, as illustrated. The cover plate C is securely fastened to section A and plate B by bolts E.

It is desired to be made known at this point that the mechanism enclosed by the aforementioned housing, as illustrated in Figure 3 of the drawings, is the same type of mechanism as disclosed in my co-pending application for Letters Patent, Serial No. 739,020, filed August 8, 1934, and it is to be understood that the said mechanism is to be considered as illustrative of, rather than limitative upon, the type of mechanism adapted to be utilized therewith. In the form of mechanism just referred to 2 indicates a drive or power shaft suitably journaled in the housing 101 and 3 indicates a driven or load shaft suitably journaled in the said housing and in axial alinement with the shaft 2.

27 and 51, respectively, indicate shifting rods journaled in any suitable well known manner for rectilinear movement in the aforementioned housing and extending exteriorly thereof for a purpose to be presently described.

As illustrated in Figures 1 and 2, section A of the housing 101 includes, on the outer portion of each side thereof, bosses 102 projecting outwardly from the said section, and the said bosses are suitably bored, as indicated at 103, to receive the upper end portions of the respective coil springs 104. The said upper end portions of the springs 104 are straightened and extend upwardly through the said bosses and the protruding upper end portions of the said springs are bent downwardly as illustrated at 105, so as to rigidly secure the upper end portions of the said coil springs to the bosses 102. Upward movement of the springs through the said bosses is prevented by the upper convolutions of the springs engaging beneath the lower surfaces of the said bosses, as indicated at 106.

The bosses 102, as illustrated, are preferably, but not necessarily, respectively positioned adjacent to the upper end portions of section A of the housing and, as shown, the aforementioned lower surfaces of the said bosses are formed with relatively flat surfaces, which surfaces extend outwardly and upwardly from the perpendicular sides of section A on an angle slightly greater than the horizontal for a purpose to be presently described.

Section A of the said housing also includes on the outer portion of each side thereof relatively wide bosses 107 projecting outwardly from the said section and the same are preferably, but not necessarily, positioned approximately midway of the bosses 102. The said bosses 107 are relatively longer than the bosses 102 and extend downwardly on the surface of section A so as to occupy a position on the said section relatively lower than that of the bosses 102 for a purpose also to be presently described. The under sides of the said bosses 107 are formed with relatively flat surfaces, which surfaces extend outwardly from section A on an angle similar to that of the under sides of the bosses 102.

A flanged member 108, shown in Figure 3, is securely fastened to the forward end of the housing 101 by bolts 109 and the said flanged member includes a portion extending outwardly therefrom to form a sleeve 110. The aforementioned drive shaft 2 is suitably journaled in the said flanged member and sleeve portion thereof.

A similar flanged member 111 is in axial alinement with the member 108 and is securely fastened to the opposite end of the aforementioned housing by bolts 112. The member 111 also includes a portion extending outwardly from the same to form a sleeve 113, and the aforementioned driven shaft 3 is journaled in the said flanged member and sleeve portion thereof.

A means for supporting the transmission and the parts associated therewith will next be described.

For illustrative purposes only as shown in Figure 1 of the drawings, the transmission is mounted on the chassis of a motor vehicle.

F represents the framework of a motor vehicle chassis and cross frame members 114 and 115 are securely fastened to the framework F by rivets 116, as shown. A pillow block 117 is positioned on the central portion of the cross member 114 and the lower mating portion of the said pillow block is second to the cross member 114 by bolts 118. A pillow block 119 is positioned on the central portion of the cross member 115 and in axial alinement with the block 117 and the lower mating portion of the pillow block 119 is secured to the cross member 115 by bolts 120.

The housing 101 is mounted on the pillow blocks so that the sleeve 110 rests on the lower mating portion of the block 117, and the sleeve 113 rests on the lower mating portion of the block 119. The upper mating portions of the pillow blocks 117 and 119 are secured, respectively, to the lower mating portions of the said blocks by bolts 121 and 122, as illustrated, so as to journal the housing 101 in the said pillow blocks and thereby adapt the said housing for rocking or oscillating movement for a purpose to be presently described. Axial shifting of the said housing is prevented by the said pillow blocks in contact with the members 109 and 111, respectively, as illustrated.

At each side of the aforementioned housing and parallel thereto longitudinal frame members 123 and 124 are positioned respectively beneath the bosses 102 and 107, and the longitudinal frame members are riveted to the cross members 114 and 115, as indicated at 125.

The lower end portions of the coil springs 104 are secured to angular plates 126 in any desired well known manner and the said plates are rigidly secured to the longitudinal frame members 123 and 124 by bolts 127, as illustrated, and so that the springs 104 are retained between the plates 126 and the bosses 102 in a position approximately perpendicular to the frame members 123 and 124.

It is to be noted at this point that the dimensions and loading of the coil springs 104 are preferably, but not necessarily, equal, so as to influence the housing 101 in maintaining a position on an even plane or of stable equilibrium. The center of gravity of the transmission is along the line drawn perpendicularly through the axis of the said housing as indicated by the numeral 128 in Figure 4 of the drawings.

Mounted upon the upper central portions of the frame members 123 and 124 and beneath the bosses 107, buffers 129 are secured to the said frame members in any well known manner and the said buffers are preferably provided with relatively flat upper surfaces for a purpose to be presently described, and the said buffers are preferably, but not necessarily, flexible in nature.

In one preferred form of the invention, as illustrated in Figure 2 of the drawings, it is to be noted that relatively small spaces are provided between the upper surfaces of the buffers 129 and the respective under surfaces of the bosses 107. However, it is to be understood that the distances between the said respective surfaces can be spaced as desired.

The operation of the transmission as associated with a motor vehicle will next be described.

When the respective driving mechanisms of the transmission are not loaded or are in a neutral condition, as shown in Figure 3 of the drawings, the housing 101 is maintained on an even keel or condition of stable equilibrium or state of rest by the springs 104, as illustrated in heavy lines in Figures 4 and 5, for the reason, as previously stated, that the dimensions and loadings of the said springs are preferably equal.

When the shifting rod 51 is moved to the right in Figure 3 and thereby connects the reverse driving mechanism to the load, the counter gears of the said driving mechanism, in tending to avoid moving the load, will displace their axes, as previously stated, in a direction opposite to the direction of rotation of the load shaft 3. The countershafts upon which the said gears are mounted, therefore, will be moved bodily in a direction opposite to the direction of rotation of the said load shaft, and since the housing 101 is the support for the said countershafts, the said housing will be rocked in a like direction to that of the countershafts and, as illustrated in dotted lines in Figure 4, for the reason that the housing 101 is journaled for rocking movement in the stationary pillow blocks 117 and 119.

Resistance to the rocking movement of the said housing is set up by the action of the coil springs 104, namely, by the compression of the springs at one side of the housing and by the tension of the springs at the opposite side thereof.

The said coil springs should preferably, but not necessarily, be of sufficient dimensions and loading in proportion to the load to be moved to enable the transmission to start or move light loads when imposed thereon with a minimum of rocking movement of the said housing and sufficient only to absorb initial thrusts imposed upon the driving mechanism of the transmission.

Since propelling a motor vehicle at normal slow starting speed, as is well known, represents the lighter load of the vehicle, the vehicle can be started in motion with a minimum of rocking movement of the housing and the initial thrusts, imposed upon the driving mechanism and housing while starting and moving the load, are gently absorbed by the springs 104 during rocking movement of the housing.

As the speed of the vehicle is accelerated, the load becomes heavier, due to friction of parts and wind resistance, and the housing rocks further in the direction previously described, with the result that greater resistance to the rocking movement of the housing is set up by the increased compression or tension of the coil springs 104. The under surfaces of the bosses 102 approach a position where they will be parallel to the upper surfaces of the plates 126, so that the coil springs at one side of the housing 101 are evenly compressed. The greater resistance to the rocking movement of the said housing caused by the action of the springs 104 enables the transmission to move the heavier load.

When the vehicle is accelerated to still greater speed or when maximum loads are to be moved through the transmission in reverse drive, the housing rocks further in the same direction as aforementioned and so that the under surface of the boss 107 which is on the then lower side of the housing 101 becomes parallel with the upper flat surface of the buffer 129 positioned beneath the said boss, and the said under surface of the said boss engages the upper surface of the said buffer so as to resist and stop the previously described rocking movement of the housing and thereby enable the transmission to positively move heavy or maximum loads through the said driving mechanism. The engagement of the boss 107 with the buffer 129 is accomplished in a gentle and silent manner for the reason that the coil springs 104 continue during such time to increasingly resist the said rocking movement of the housing and also because the buffer 129 is preferably of a flexible body and therefore inherently quiet in contact with another body.

When the rod 51 is returned to the position shown in Figure 3, thereby disengaging the reverse gear driving from the load and placing the transmission in a neutral condition, the housing 101 is returned to a position on an even keel or condition of stable equilibrium or state of rest by the action of the springs 104 for the reason that the said springs, as previously stated, tend constantly to maintain the housing in the said position or conditions.

When the rod 51 is moved to the left in Figure 3, thereby drivingly connecting the low gear driving mechanism to the load, the vehicle is started and moved forward in low gear and the counter gears of the said driving mechanism, in tending to avoid moving the load, rock the housing 101 in a direction illustrated in dotted lines of Figure 5, and which direction is opposite to the direction of rocking movement of the said housing when the transmission is in a condition of reverse drive, as previously described, since the direction of rotation of the load shaft 3 is correspondingly reversed. The tension and compression of the respective coil springs 104 are also reversed from their action, as previously described, during reverse drive, by reason of the reversed direction of rocking movement of the housing and the action of the said coil springs in resisting the rocking movement of the housing enables the low gear driving mechanism to move the vehicle forward in a manner similar to the manner in which the reverse gear driving mechanism moves the vehicle in a reverse direction, as previously described. When relatively heavier or maximum loads are required to be moved through the low gear driving mechanism, the boss 107 which is positioned on the then lower side of the housing 101 moves into engagement with the buffer 129 positioned beneath the said boss, so as to stop the rocking movement of the housing and thereby enable the transmission to move maximum loads through the low gear driving mechanism in a positive manner.

When the rod 51 is again returned to the position shown in Figure 3, the housing 101 is again returned to a condition of stable equilibrium by the action of the springs 104, as previously described.

When the rod 27 is moved to the right in Figure 3, thereby connecting the intermediate gear driving mechanism to the load, the vehicle is moved forward in intermediate gear in a manner similar to the manner in which the vehicle is moved forward in low gear, as previously described, and the housing 101 rocks in the direction illustrated in dotted lines in Figure 5. If the vehicle has gained momentum at the time of placing the transmission in a condition of intermediate gear, accelerating the vehicle to greater speeds in intermediate gear causes the boss 102 at the then lower side of the aforementioned housing to move into relatively quicker contact with the buffer 129 positioned beneath the said boss, for the reason that the higher speed load, due to friction of parts and wind resistance, as previously stated, is correspondingly heavier, however, as is well known, the torque re-action is greatest in a driving mechanism which has the lowest gear ratio and, therefore, in starting maximum loads from a stationary position, the contact between the boss 102 and the buffer 129 would be accelerated if the lowest gear driving mechanism was active.

When the rod 27 is moved to the left in Figure 3, thereby directly connecting the power shaft 2 and the load shaft 3 for a direct drive in the conventional manner, the housing 101 is maintained in a position on an even keel by the springs 104 for the reason that no fulcrum is required for the said direct drive mechanism when the shafts are locked for a direct drive and this type of driving mechanism is therefore not adapted to absorb circumferential thrusts when imposed thereon.

It is to be understood at this point that the respective gear driving mechanisms of the transmission, as previously described, can be of any desired ratio so as to provide driving mechanisms of any desired ratio between the aforementioned power and load shafts.

If it is desired to provide a transmission which includes a high gear driving mechanism of the type which is adapted to absorb initial thrusts when imposed upon the said driving mechanism, the aforementioned intermediate gear driving mechanism can be replaced by a driving mechanism which provides a one to one ratio between the aforementioned power and load shafts and wherein the respective counter gears of the said driving mechanism are preferably of relatively large diameter and identical to each other in number of teeth. Where this type of high gear driving mechanism is utilized, when the rod 27 is moved to the right in Figure 3, thereby drivingly connecting the said high gear driving mechanism to the load, the vehicle is moved forward in a high gear drive in a manner which is similar to the manner in which the vehicle is moved forward in low or intermediate drive, as previously described, and the housing 101 rocks in a direction which is similar to its direction of movement when the transmission is operating in a low or intermediate gear drive. As the heavier loads, caused by acceleration of the vehicle to greater speeds, are imposed upon the high gear driving mechanism, the boss 107 which is positioned on the then lower side of the housing moves into contact with the buffer 129 positioned beneath the said boss and a positive transmission of power for heavy or maximum high gear loads is thereby provided. When the vehicle has gained sufficient momentum in high gear, the rod 27 can be moved to the left so as to easily engage the shafts 2 and 3 in a direct drive or vice versa for the reason that the speed of the aforementioned shafts is synchronized by the said high gear or the said direct drive mechanisms.

It is to be carefully noted at this point that the aforementioned direct drive mechanism, wherein the power and load shafts are locked in a direct drive, differs from the high gear driving mechanism, wherein the power and load shafts are connected through gears which provide a one to one ratio between the said shafts, and the latter driving mechanism will hereinafter be referred to as the high gear driving mechanism.

The aforementioned high, intermediate, low and reverse gear driving mechanisms of the transmission are adapted to utilize the compression of the engine or source of power as a braking force in the following manner: When the vehicle has been accelerated in either a forward or reverse drive through one of the respective gear driving mechanisms and the accelerator is then released, the momentum of the vehicle causes a force to be exerted on the load shaft 3 tending to rotate the same at a speed equal or greater than that of the power shaft 2. If the speeds of the said shafts are equal, the housing 101 is returned to a position on an even keel by the springs 104 for the reason that no load is then placed on the driving mechanism. As the speed of the power shaft 2 becomes less and is gradually reduced from that of the load shaft 3, thereby becoming gradually reduced from that of the load shaft 3, thereby becoming a gradually increasing load, the force of momentum exerted on the shaft 3, in acting against the load, causes the counter gears of the driving mechanism through which the shafts are then connected to rock the housing 101 in the same manner and direction as when the functions of the said shafts are correspondingly reversed and as previously described when the transmission is operating in either a forward or reverse drive. The action of the springs 104, in increasingly resisting the rocking movement of the housing, as previously described, causes the transmission to utilize the compression of the engine through the said driving mechanisms in a gradual and even manner. When the compression of the engine becomes a heavy or maximum load, the force of momentum exerted on the load shaft 3, acting against the said load, causes the housing 101 to rock to a position where the boss 107 at the then lower side of the housing engages the buffer 129 positioned beneath the said boss and the full compression of the engine is then utilized.

Because of the previously described rocking movement of the housing 101 and the action of the springs 104 in absorbing the initial thrusts imposed upon the driving mechanisms of the transmission when starting and moving the load, the vehicle can be started and moved without the necessity of slippage occurring within the clutch mechanism and the possibility of stalling the engine while starting the vehicle is minimized for the reason that the gear driving mechanisms first transmit the power from the engine to the load in a yielding manner. Since the aforementioned high gear driving mechanism is adapted to first yieldingly and then positively transmit power in the manner as also previously described, the vehicle can be started and moved at desired speeds through the high gear driving mechanism.

It has been previously stated that the housing 101 is maintained in a position on an even keel by the springs 104 when the transmission is in a neutral condition so as to adapt the housing for absorbing thrusts when imposed thereon and therefore change of speed from one driving mechanism to another driving mechanism can be made as desired without the necessity of disengaging or using the clutch mechanism during such change for the reason that the transmission is first returned to a neutral condition when changing speeds from one driving mechanism to another driving mechanism and the resulting shock from engaging a driving mechanism is absorbed by the rocking movement of the housing and the counteraction of the coil springs 104.

The manner in which the change speed lever is associated with the transmission will next be described. As illustrated in Figure 6, the numeral 130 represents a cross frame member positioned beneath and parallel to the floor boards of the vehicle and forward of the transmission and the said cross member is securely fastened to the framework of the vehicle in any desired well known manner. The lower portion of a conventional change speed lever 131 is mounted in a housing 132 in the conventional manner and the said housing is securely fastened to the aforementioned cross member 130 in any well known manner as desired. The lower end portion of the lever 131 is reduced and a roller 133 is mounted for rotary movement on the reduced end portion of the said lever for a purpose to be presently described. The lower end of the lever 131 is then slightly enlarged so as to retain the roller 133 on the said reduced end portion and the said roller is prevented from axial shifting at the opposite end by a shoulder, as indicated at 134, formed by the said reduced end portion of the said lever.

The aforementioned shifting rods 27 and 51 extend exteriorly of the aforementioned housing 101, as previously stated, and in a forward direction of the said housing and, as illustrated in Figure 1, the forward ends of the said rods are formed with bosses 135 and 136 respectively projecting outwardly from the said rods 27 and 51. Slots 137 and 138 are respectively cut in the upper surfaces of the bosses 135 and 136 and the said slots are of sufficient width and depth to freely accommodate the aforementioned roller 133 when the lower end portion of the change speed lever 131 is inserted therein. The bosses 135 and 136 are positioned with relation to the lever 131 in a manner so that the slots 137 and 138 are in the same vertical plane with the lower end portion of the said lever when the said lower end portion is in a perpendicular position and engagement of the lever 131 with the said slots is made in the conventional manner.

When the rods 27 and 51 are operatively moved to their respective positions by the lever 131 so as to connect the driving mechanisms to the load, the housing 101 is rocked or oscillated in the manner previously described and the rods 27 and 51 are carried bodily with the housing during the rocking or oscillating movement of the same. The change speed lever 131 is held in a stationary position in the conventional manner when the respective driving mechanisms are connected to the load and the rocking movement of the rod 27 or 51, which same is then in engagement with the said lever, causes the roller 133 to rotate upon its axis and thereby facilitate easy rocking movement of the rod 27 or 51. The slots 137 and 138 must necessarily be of sufficient length and depth so that the lever 131 will remain in constant engagement with the rod 27 or 51 during the rocking movement of the housing.

A modified form of the invention is illustrated in Figure 7, wherein the bosses 107, the buffers 129, and the angular plates 126 are eliminated and means are provided for adjusting the loading of the springs 104 so as to adapt the transmission for first yieldingly and then positively transmitting power through the respective driving mechanisms, in proportion to the load to be moved, as desired.

In this type of mounting for the transmission, adjusting brackets 139 of a well known type are positioned beneath the bosses 102, and the said brackets include angular portions 140, which same extend outwardly and then downwardly from the brackets and the said angular portions of the brackets are secured to the longitudinal frame members 123 and 124 by bolts 141, as illustrated, so as to retain the brackets 139 in positions approximately perpendicular.

The lower end portions of the coil springs 104 are secured to adjustable plates 142 in any well known manner, and the said plates are loosely mounted and guided in the upper hollow portions of the brackets 139. Means for adjusting the plates 142 to respective positions are provided in a manner which is well known by the set screws 143, which latter are screwed through the bored and tapped lower end portions of the said brackets and locked in position by the lock nuts 144. Collars 145 are securely fastened to the upper end portions of the set screws 143 in any desired well known manner, and the said collars are adapted to freely rotate in spaces provided between the under surfaces of the plates 142 and the upper surfaces of collars 146, which latter are loosely mounted on the set screws 143 and securely fastened to the under surfaces of the plates 142 in any well known manner.

When the plates 142 are moved to positions to adjust the tension or compression of the springs 104, the transmission is adapted to move light or heavy loads as desired, first in a yielding manner as previously described and then in a positive manner for the reason that the springs 104, by their previously described action, automatically adjust themselves so as to provide the desired fulcrum for moving the load in a positive drive.

Another modified form of the invention is illustrated in Figure 8, wherein the bosses 102 and the coil springs 104 are eliminated. In this type of mounting for the transmission, the lower surfaces of the bosses 107 rest upon the upper surfaces of the flexible buffers 129, as illustrated, and the previously described rocking or oscillating movement of the housing 101 is retarded and then stopped by the flow of the buffers, so as to adapt the transmission for first yieldingly and then positively transmitting power through the respective driving mechanisms in the manner previously described.

The means illustrated in the drawings for cushioning or retarding or stopping the rocking or oscillating movement of the housing 101, as previously described, are shown for illustrative purposes only, and it is to be understood that the coil springs 104 and the buffers 129 can be replaced by any other mechanisms of a well known type which are adapted to cushion or retard or stop the previously described rocking or oscillating movement of the housing, for instance, shock absorbers of any well known type or fluids or materials of any well known type and which are of a flexible or cushioning nature.

While the transmission and a means for mounting the same as heretofore described is shown in association with a motor vehicle, it will be understood that the same is adapted for other uses and purposes and that features of the invention are to apply to power transmission devices wherever they may be used or wherever power is transmitted from a drive to a driven shaft, and while preferred forms of the invention have been heretofore described, it is to be understood that the drawings and description thereof are to be considered as illustrative of, rather than limitative upon, the broader claims because it will be apparent to those skilled in the art that changes may be made in the mechanism without departing from the scope of this invention.

I claim:

1. In an organization of the class described, a power transmission including driving and driven mechanisms, respectively; stop means; and means for supporting the transmission relatively to the stop means to swing as a unit from a position of disengagement therefrom to a position of engagement therewith in response to torque occurring in the driving mechanism when a load is imposed upon the latter; and means for yieldingly cushioning said transmission during movement thereof as aforestated.

2. In mechanism of the class described, a power transmission; means for supporting same to swing in response to the effect of torque when created at the driving means of said transmission when under load; means for cushioning said transmission while swinging and means for fixing the extent of said swinging, thereby enabling power to be yieldingly transmitted during said movement, then positively transmitted when the movement ceases, the said last named means including co-acting parts disposed upon the transmission and a stationary part, respectively, and co-acting to limit the amount of power yieldingly transmitted through said transmission.

3. In an organization of the class described, a power transmission including driving and driven mechanisms, respectively; stop means; and means for supporting the transmission relatively to the stop means to swing as a unit from a position of disengagement therefrom to a position of engagement therewith in response to torque occurring in the driving mechanism when a load is imposed upon the latter; and retarding means, independent of the aforementioned stop means and operatively connected with the transmission for retarding the movement thereof as aforestated.

4. In an organization of the class described, a power transmission unit; stop means; and means for supporting the unit, relatively to the stop means, to turn in a rotary direction for a pre-calculated distance, from a position of disengagement therefrom to a position of engagement therewith, in re-action to torque when occurring in the unit; and means for yieldingly resisting the turning movement as aforestated.

5. In an organization of the class described, a pair of spaced apart stopping means; a transmission assembly disposed between said stopping means and including means for supporting same to turn in either direction about a substantially non-shiftable axis, the assembly including means disposed to engage one or the other of the stopping means according as the assembly turns in one direction or the other; and means for interposing a retarding force between the stopping means and said engaging means.

6. In an organization of the class described, the combination with a power transmission assembly which includes a housing for the assembly and of the selective gear type of means for supporting the same to swing in response to the effect of torque when occurring in the asembly; means for cushioning said assembly while swinging and for fixing the extent of said swinging, thereby enabling power to be yieldingly transmitted by said assembly during said movement then positively transmitted when the movement ceases, and means, operatively connected wth said gears, for selectively controlling the same.

7. In an organization of the class described, a pair of spaced apart stopping means; a transmission assembly which includes a housing for the assembly and of the selective gear type disposed between said stopping means and including forward and reverse driving mechanisms; means for supporting the assembly to turn in either direction about a substantially non-shiftable axis; the asembly including means disposed to engage one or the other of the stopping means according as the asembly turns in one direction or the other in response to the effect of torque ocurring in the driving mechanism when a change over from forward to reverse drive or vice versa is effected so as to provide for a positive drive through said driving mechanisms, and means operatively connected with said driving mechanisms for selectively controlling the same.

8. A power transmission mechanism including a housing having co-axially arranged driving and driven shafts therein; means for mounting the housing to rock about a fixed axis in response to torque when imposed on said shafts; fixed supports at opposite sides of said axis; stop members on the supports and housing co-acting to limit the rocking movement of the housing; springs disposed at opposite sides of said axis; and means for operatively connecting the springs to said supports and housing for co-acting in yieldingly resisting rocking movement of the housing, thereby enabling power to be yieldingly transmitted during said movement; the said stop members being disposed on the supports and housing so as to regulate the amount of yielding power transmitted through said mechanism.

9. The combination with a support; a selective transmission mechanism including forward and reverse driving means; a housing enclosing said mechanisms; co-axially arranged driving and driven shafts mounted in the said housing and to which the said driving mechanisms can be selectively connected operatively; of means for journaling the driving and driven shafts on the support to rotate about a fixed axis, and for mounting the housing to rock about the said axis in response to torque when imposed on the shafts; co-acting means on the support and housing at opposite sides of said axis for yieldingly sustaining the housing in an intermediate position in the absence of torque imposed on said shafts; and co-acting cushioned means on the support and housing for definitely limiting rocking movement of the housing in an extreme position at one side or the other of said intermediate position according as torque is imposed in one direction or the other on said shafts.

10. A power transmission including a housing having driving and driven mechanisms therein; means for mounting the housing to rock about a fixed axis; fixed supports at opposite sides of said axis; stop members on the supports and housing co-acting to limit the rocking movement of the housing; yieldable means at opposite sides of said axis; and means for operatively connecting said yieldable means to said support and housing for co-acting in resisting rocking movement of the housing between the limits defined by said stop members.

11. A power transmission including a housing having driving and driven mechanism therein; means for mounting the housing to rock about a fixed axis; fixed supports at opposite sides of said axis; stop members on the support and housing co-acting to limit the rocking movement of the housing; yieldable means at opposite sides of said axis; and means for operatively connecting said yieldable means to said support and housing for co-acting in resisting rocking movement of the housing between the limits defined by said stop members; the yieldable means at one side of the axis being stressed by compression and the yieldable means at the opposite side of said axis being stressed by tension or vice versa, according as the housing is rocked in one direction or the other.

12. A power transmission including a housing having co-axially arranged sleeves at opposite ends thereof and driving and driven mechanisms operating in the housing and including driving and driven shafts journaled in said sleeves; fixed bearings in which the said sleeves are journaled to mount the housing for rocking movement about the common axis of the sleeves; stop means on the housing; and cushioned stop means disposed at opposite sides of the said axis and co-acting with the stop means on the housing for definitely limiting the rocking movement of the said housing; springs disposed at opposite sides of the said axis and operatively connected with the housing for yieldingly sustaining the housing in an intermediate position between said stop means in the absence of torque imposed on said shafts, the said springs at one side of the said axis being stressed by tension and the springs at the opposite side of said axis being simultaneously stressed by compression or vice versa to yieldingly resist rocking movement of the housing in either direction about the said axis when torque is imposed on said shafts.

13. In mechanism of the class described, a power transmission; means for supporting same to swing in response to the effect of torque when occurring in the transmission; yieldable means, operatively connected with the transmission and with a fixed part for cushioning said transmission while swinging, means whereby the extremities of movement of the yieldable means defines the extent of said swinging, thereby enabling power to be yieldingly transmitted during said movement, and means for interposing stop means between the limits defined for movement of the yieldable means so as to stop the said movement and thereby regulate the maximum amount of power yieldingly transmitted through said transmission.

14. In mechanism of the class described, a power transmission; means for supporting same to swing from an even to an uneven keel or vice versa about a substantially non-shiftable axis in dependence of torque or the absence of torque when occurring in the transmission, means for cushioning said transmission while swinging and acting to fix the extent of said swinging, thereby enabling power to be yieldingly transmitted during said movement, and means for interposing stop means between the limits defined for movement of the transmission to stop movement thereof so as to provide for a positive transmission of power and to regulate the amount of power yieldingly transmitted through said transmission.

15. In an organization of the class described, a power transmission assembly of the selective change speed gear type, means mounting said assembly to swing about a longitudinally and laterally fixed axis in response to the effect of torque when occurring in the assembly, means for yieldingly cushioning said assembly while swinging, means whereby the degree of movement of the cushioning means governs and defines the extent of said swinging, thereby enabling power to be yieldingly transmitted during said movement, means for interposing stop means between the limits defined for movement of the assembly to stop movement of the same before maximum movement of the cushioning means is reached so as to regulate the amount of power yieldingly transmitted through said assembly and to thereby enable power to be positively transmitted when the movement ceases, and means operatively connected with said gears for selectively controlling the same.

16. In mechanism of the class described, a power transmission unit including a housing with laterally extending abutments thereon, means providing a rigid support for said unit and a mounting about the axis of which the unit can turn in response to the effect of torque when occurring in the unit, and flexible cushioning means interposed between said abutments and said support and bearing against the same and operable to yieldingly resist and stop the said turning movement in proportion to the degree of torque forces occurring in the unit.

EARL E. COTANCH.